United States Patent
Andrysco

(10) Patent No.: US 9,575,559 B2
(45) Date of Patent: Feb. 21, 2017

(54) GAZE-ASSISTED TOUCHSCREEN INPUTS

(71) Applicant: INTEL CORPORATION, Santa Clara, CA (US)

(72) Inventor: Nathan R. Andrysco, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 143 days.

(21) Appl. No.: 14/127,955

(22) PCT Filed: Nov. 1, 2013

(86) PCT No.: PCT/US2013/068125
§ 371 (c)(1),
(2) Date: Dec. 19, 2013

(87) PCT Pub. No.: WO2015/065478
PCT Pub. Date: May 7, 2015

(65) Prior Publication Data
US 2015/0338914 A1  Nov. 26, 2015

(51) Int. Cl.
G06F 3/01 (2006.01)
G06F 3/041 (2006.01)
G06F 3/0488 (2013.01)

(52) U.S. Cl.
CPC .............. *G06F 3/013* (2013.01); *G06F 3/041* (2013.01); *G06F 3/0488* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS

| 6,204,828 | B1 | 3/2001 | Amir et al. | |
|---|---|---|---|---|
| 2011/0304606 | A1* | 12/2011 | Walsh | G06F 3/013 345/214 |
| 2012/0146891 | A1* | 6/2012 | Kalinli | H04N 19/33 345/156 |
| 2012/0272179 | A1 | 10/2012 | Stafford | |
| 2013/0145304 | A1 | 6/2013 | Deluca et al. | |
| 2013/0169560 | A1* | 7/2013 | Cederlund | G06F 3/013 345/173 |

(Continued)

FOREIGN PATENT DOCUMENTS

KR   102013-0081117 A   7/2013

OTHER PUBLICATIONS

International Search Report and Written Opinion mailed Aug. 22, 2014 for International Application No. PCT/US2013/068125.

(Continued)

*Primary Examiner* — Jason Olson
*Assistant Examiner* — Krishna Neupane
(74) *Attorney, Agent, or Firm* — Schwabe Williamson & Wyatt PC

(57) ABSTRACT

Embodiments related to gaze-assisted touchscreen inputs are disclosed. In some embodiments, a computing system may receive a gaze location signal indicative of a region of a user's gaze on a touchscreen, receive a touch signal indicative of a touch of the user on the touchscreen, and generate an input signal for the computing system based at least in part on the gaze location signal and the touch signal. Other embodiments may be disclosed and/or claimed.

26 Claims, 5 Drawing Sheets

(56) References Cited

U.S. PATENT DOCUMENTS

2014/0313230 A1* 10/2014 Suggs .................. G06T 3/00
        345/648
2015/0077357 A1* 3/2015 Han .................. G06F 3/013
        345/173

OTHER PUBLICATIONS

Bohme et al., "Remote Eye Tracking: State of the Art and Directions for Future Development", The 2nd Conference on Communication by Gaze Interaction—COGAIIN 2006: Gazing into the Future, Lubeck, Germany, 5 pages.
Daunys et al., "D5.2 Report on New Approaches to Eye Tracking," Communication by Gaze Interaction (COGAIIN), IST-2003-511598, 61 pages.
http://en.wikipedia.org/wiki/Homography, 3 pages.
http://en.wikipedia.org/wiki/Keystone_effect, 3 pages.
http://en.wikipedia.org/wiki/Leap_Motion, 3 pages.
http://notbrainsurgery.livejournal.com/40465.html, 5 pages.
http://en.wikipedia.org/wiki/Perspective_control, 3 pages.
http://thediplomat.com/tech-biz/2013/06/03/samsung-galaxy-s4-paves-way-for-eye-tracking-tech, 2 pages.
http://en.wikipedia.org/wiki/Texture_mapping, 4 pages.
Witzner et al., "In the Eye of the Beholder: A Survey of Models for Eyes and Gaze," Jan. 23, 2009, 42 pages.

* cited by examiner

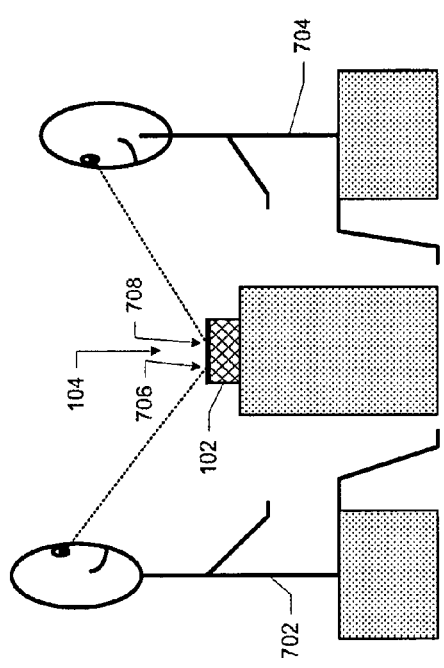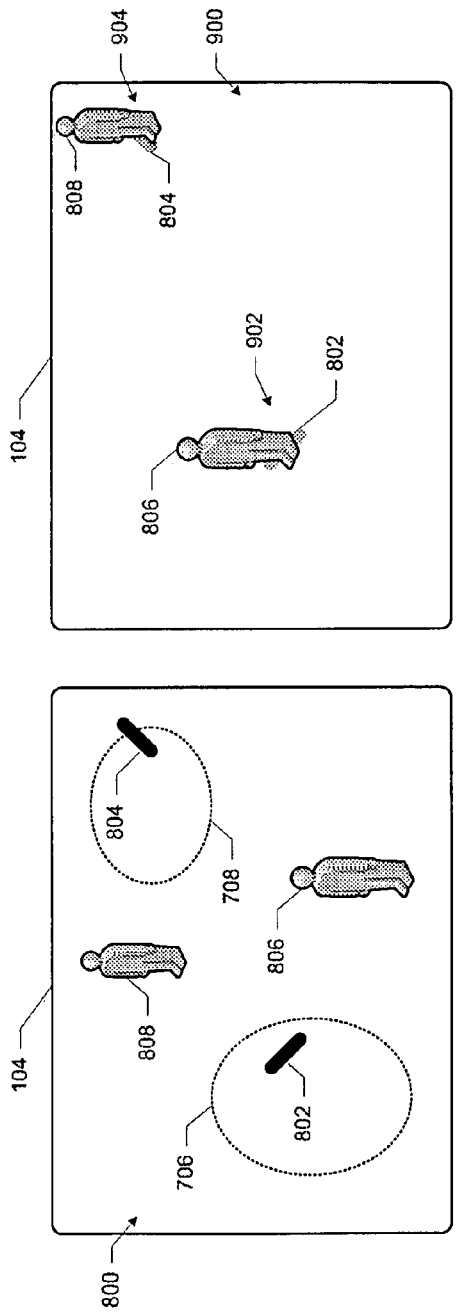

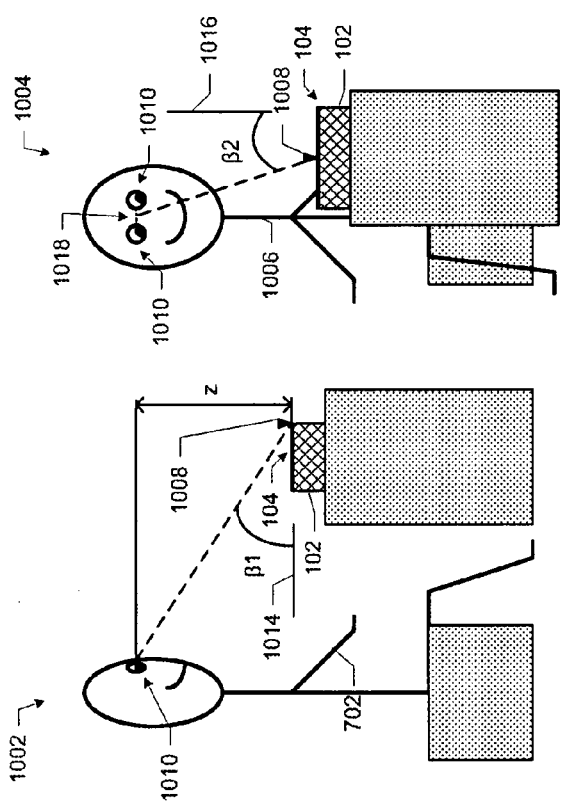

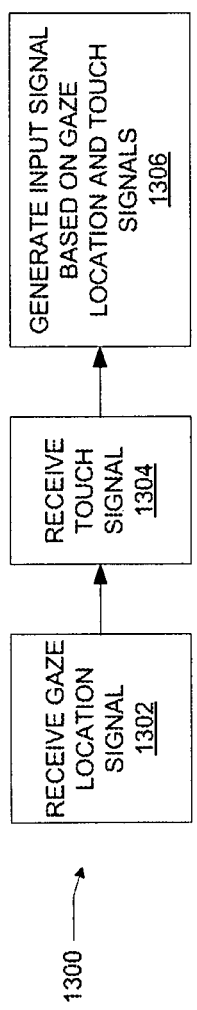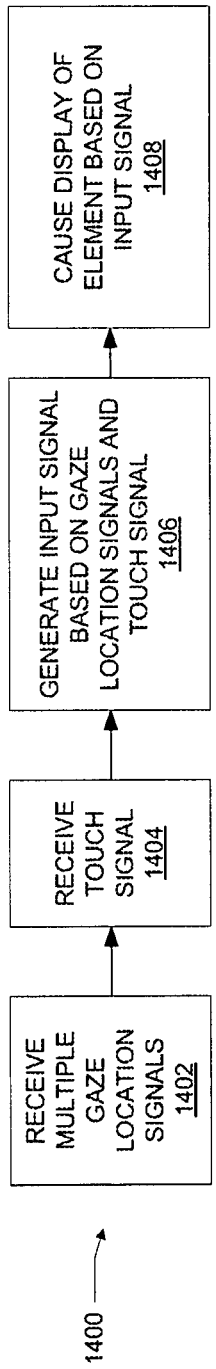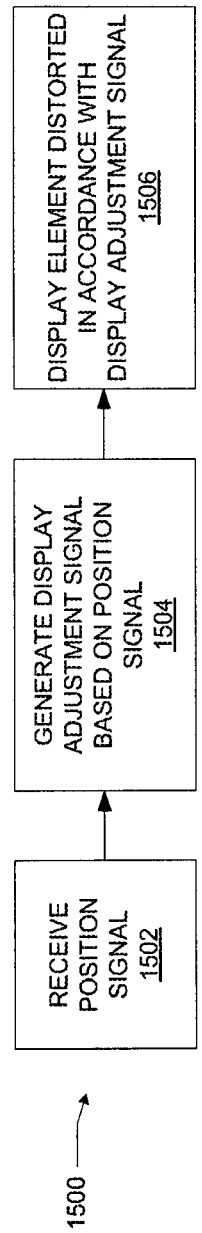

GAZE-ASSISTED TOUCHSCREEN INPUTS

CROSS REFERENCE TO RELATED APPLICATION

The present application is a national phase entry under 35 U.S.C. §371 of International Application No. PCT/US2013/068125, filed Nov. 1, 2013, entitled "GAZE-ASSISTED TOUCHSCREEN INPUTS," which designated, among the various States, the United States of America, and which is hereby incorporated by reference.

TECHNICAL FIELD

The present disclosure relates generally to the field of data processing, and more particularly, to gaze-assisted touchscreen inputs.

BACKGROUND

Users of touchscreen-based devices (such as tablets and smartphones) are often frustrated by the devices' limited ability to differentiate between different kinds of touches and to respond in unexpected ways to stray touches. Additionally, when users view these devices at unusual angles (e.g., from the extreme right or left of the device), touch accuracy is compromised by the parallax effect, in which the desired location of touch does not align with the actual location of touch. These performance limitations may significantly reduce a user's quality of experience with touchscreen devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 7 illustrates two users viewing the touchscreen of the computing system of FIG. 1, in accordance with various embodiments.

FIGS. 8 and 9 illustrate gaze regions, touches and displays rendered on the touchscreen of the computing system of FIG. 1 before and after processing of touch signals of two users, in accordance with various embodiments.

FIG. 10 illustrates a scenario for the generation of a position signal when a user views the touchscreen of the computing system of FIG. 1, in accordance with various embodiments.

FIGS. 11 and 12 illustrate displays rendered on the touchscreen of the computing system of FIG. 1 before and after processing of a position signal, in accordance with various embodiments.

FIG. 13-15 are flow diagrams of illustrative processes for generating gaze-assisted touchscreen inputs, in accordance with various embodiments.

DETAILED DESCRIPTION

Figure 2:
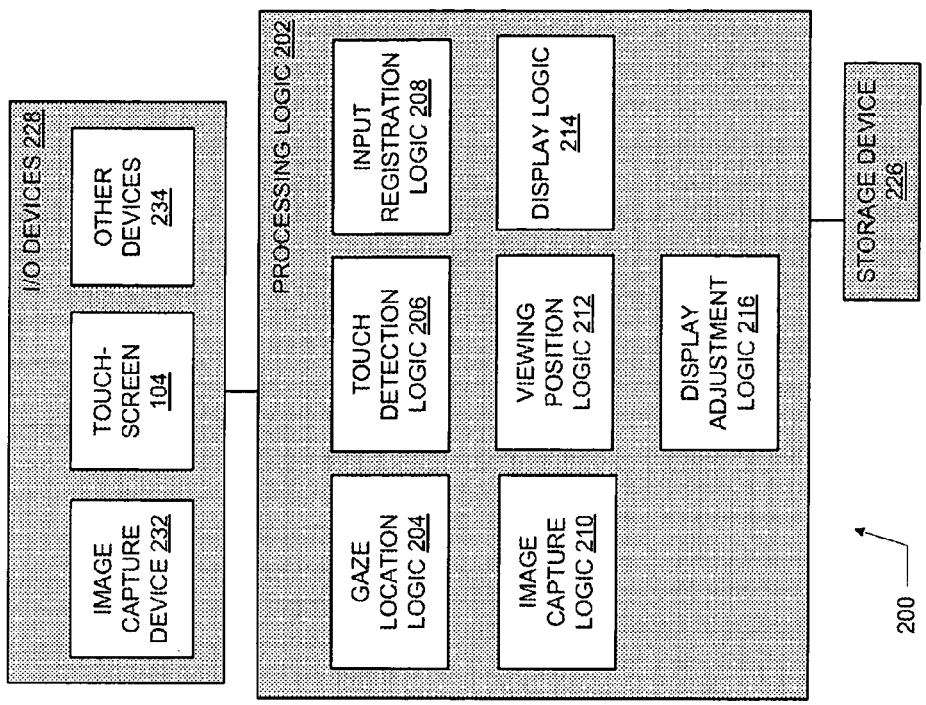
FIG. 2 is a block diagram of an illustrative gaze-assisted touchscreen input system that may be implemented by the computing system of FIG. 1, in accordance with various embodiments.

Embodiments related to gaze-assisted touchscreen inputs are disclosed. In some embodiments, a computing system may receive a gaze location signal indicative of a region of a user's gaze on a touchscreen, receive a touch signal indicative of a touch of the user on the touchscreen, and generate an input signal for the computing system, based at least in part on the gaze location signal and the touch signal.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As used herein, a signal may be "received" by a component if it is generated externally or internally to that component, and acknowledged and/or processed by that component.

Figure 1:
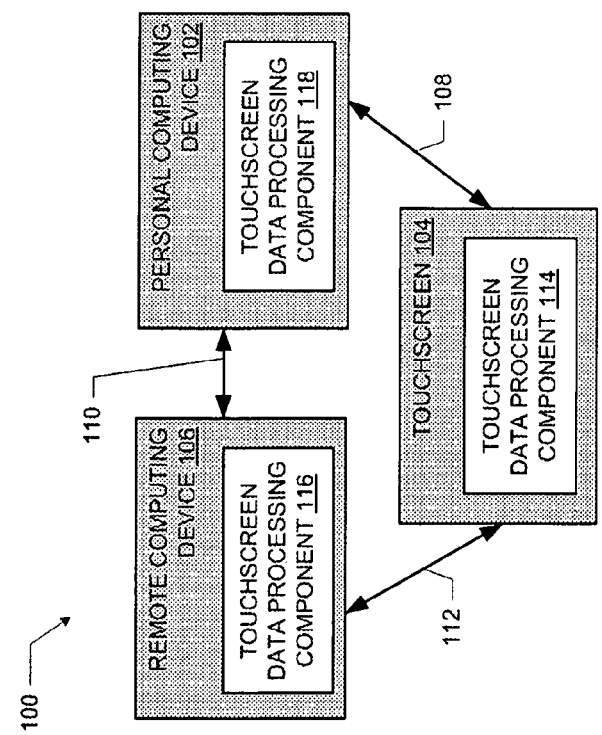
FIG. 1 is a block diagram of an illustrative computing system configured for gaze-assisted touchscreen inputs, in accordance with various embodiments.

FIG. 1 depicts an illustrative computing system 100 configured for gaze-assisted touchscreen inputs, in accordance with various embodiments. In some embodiments, the computing system 100 may be configured to receive a gaze location signal indicative of a region of a user's gaze on a touchscreen of the computing system, receive a touch signal indicative of a touch of the user on the touchscreen, and generate an input signal for the computer system, based at least in part on the gaze location signal and the touch signal. The computing system 100 may include a personal computing device 102, a touchscreen 104, and a remote computing device 106. Each of the personal computing device 102, the touchscreen 104 and the remote computing device 106 may include gaze-assisted touchscreen input components (illustrated in FIG. 1 as gaze-assisted touchscreen input components 114, 116 and 118, respectively). Gaze-assisted touchscreen input operations may be distributed between the gaze-assisted touchscreen input components 114, 116 and 118 of the computing system 100 as suitable. Several examples of the distribution of gaze-assisted touchscreen input operations between the personal computing device 102, the touchscreen 104 and the remote computing device 106 are discussed herein, but any other combination of more or fewer components, and any other distribution of the operations, may be used. For example, in some embodiments, the gaze-assisted touchscreen input component 114 or the gaze-assisted touchscreen input component 118 may be omitted, and all suitable gaze-assisted touchscreen input operations (e.g., any of those described herein) may be performed by the remaining gaze-assisted touchscreen input component(s). In some embodiments, the computing system 100 may be configured as the gaze-assisted touchscreen input system 200 discussed below with reference to FIG. 2. Except for the gaze-assisted touchscreen input teachings of the present disclosure incorporated therein, the personal computing device 102, the touchscreen 104, and the remote computing device 106 may be a broad range of such devices known in the art. Specific, but not limiting, examples are described below.

Communication between the components of the computing system 100 may be enabled by the communication pathways 108, 110 and 112. The communication pathways 108, 110 and 112 may each include wired communication pathways and/or wireless communication pathways, over direct couplings, and/or over personal, local and/or wide area networks. Each of the personal computing device 102, the touchscreen 104 and the remote computing device 106 may include suitable hardware for supporting the communication pathways 108, 110 and 112, such as network interface cards, modems, WiFi devices, Bluetooth devices, and so forth. In some embodiments, the communication pathways 108, 110 and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices included in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. In some embodiments, the computational logic may include any of the logic discussed below with reference to FIG. 2.

Although illustrated as three separate components in FIG. 1, the personal computing device 102, the touchscreen 104, and the remote computing device 106 may be combined or divided in any desired manner. For example, in some embodiments of the computing system 100, the personal computing device 102 may be a tablet or smartphone, and the touchscreen 104 may be integral to the tablet or smartphone (e.g., forming a surface of the tablet or smartphone). In some embodiments, the touchscreen 104 may be a stand-alone device (e.g., a drawing tablet) and the personal computing device 102 may be a desktop computer configured to perform gaze-assisted touchscreen input operations (such as those described herein) based on touch data transmitted from the touchscreen 104 to the personal computing device 102 through a wired or wireless communication pathway 108. A number of additional combinations are described herein.

The personal computing device 102 may be a computing device that is integrated into a garment, accessory or other support structure that is configured to be worn on the body of the user (or "wearer"). Examples of suitable support structures for a wearable personal computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), shoes, a lanyard or nametag, a contact lens, or an implantable support structure, among others. In some embodiments, the personal computing device 102 may be a wearable computing device including an image capture device (e.g., the image capture device 232 of FIG. 2, discussed below). In some embodiments, the personal computing device 102 may be a wrist-mounted computing device having an image capture device. In some embodiments, the personal computing device 102 may be a glasses-mounted computing device having an image capture device facing the wearer. In some embodiments, the personal computing device 102 may be a wearable computing that includes a "world-facing" image capture device (i.e., an image capture device directed away from the wearer).

The personal computing device 102 may be a desktop or stand-alone computing device, or a computing device configured for carrying in a pocket, backpack or other carrying case, and for operation with one or more of a user's hands. Examples of computing devices that may serve as the personal computing device 102 include cellular phones, smartphones, other handheld mobile communication devices, tablets, electronic book readers, personal digital assistants, laptops, or other such computing devices. Although the personal computing device 102 (and other components described herein) may be referred to in the singular, any number of personal computing devices may be included in the personal computing device 102 (and similarly, any component may include multiple such components).

Image processing and other operations performed by the personal computing device 102 may be controlled by an app or plug-in on the personal computing device 102, for example. In some embodiments, the personal computing device 102 may include two or more computing devices, one of which has more computing resources (e.g., processing power, memory, and/or communication bandwidth) than another. For example, the personal computing device 102 may include a larger tablet computing device and a smaller wrist- or glasses-mounted computing device. In such embodiments, data captured and preliminarily processed by the smaller computing device (e.g., image, audio, or other sensor data) may be transmitted from the smaller computing device to, the larger computing device for further processing.

The computing system 100 may include a touchscreen 104. As used herein, a "touchscreen" may include a device that provides a screen on which a visual display is rendered that may be controlled by contact with a user's finger or other contact instrument (e.g., a stylus). For ease of discussion, the primary contact instrument discussed herein may be a user's finger, but any suitable contact instrument may be used in place of a finger. Non-limiting examples of touchscreen technologies that may be used to implement the touchscreen 104 include resistive touchscreens, surface acoustic wave touchscreens, capacitive touchscreens, infrared-based touchscreens, and any other suitable touchscreen technology.

The touchscreen 104 may include suitable sensor hardware and logic to generate a touch signal. A touch signal may include information regarding a location of the touch (e.g., one or more sets of (x,y) coordinates describing an area, shape or skeleton of the touch), a pressure of the touch (e.g., as measured by area of contact between a user's finger or a deformable stylus and the touchscreen 104, or by a pressure sensor), a duration of contact, any other suitable information, or any combination of such information. In some embodiments, the touchscreen 104 may be configured to stream the touch signal to the personal computing device 102 and/or the remote computing device 106 via a wired or wireless communication pathway (e.g., the pathways 108 and 112, respectively). In some embodiments, as noted above, the touchscreen 104 may be connected locally to (or integrated with) the personal computing device 102.

The remote computing device 106 may include one or more servers (e.g., arranged in a "cloud" computing configuration) or other computing devices remote from the personal computing device 102 and/or the touchscreen 104. The communication pathway 110 between the personal computing device 102 and the remote computing device 106, and communication pathway 112 between the touchscreen 104 and the remote computing device 106, may be configured according to any remote wired or wireless communication protocol. In some embodiments, the remote computing device 106 may have more computing resources (e.g., processing power, memory, and/or communication bandwidth) than the personal computing device 102 or the touchscreen 104. Thus, in some embodiments, data captured and preliminarily processed by the personal computing device 102 and/or the touchscreen 104 (e.g., touch data embodied in a touch signal) may be transmitted over the communication pathways 110 and/or 112 to the remote computing device 106 for further processing. In some embodiments, the remote computing device 106 may perform most of the gaze-assisted touchscreen input operations discussed below with reference to FIG. 2. In some embodiments, the remote computing device 106 may include a storage device for storing touch signals, gaze location signals (discussed below), or any other data that may be accessed when the computing system 100 performs a gaze-assisted touchscreen input operation in accordance with the techniques disclosed herein.

In some embodiments of the gaze-assisted touchscreen input systems disclosed herein, one or more of the communication pathways between components of the computing system 100 may not be included. For example, in some embodiments, the touchscreen 104 may not communicate directly with the remote computing device 106 via the communication pathway 112, but may communicate with the remote computing device 106 via the personal computing device 102 and the communication pathways 108 and 110.

FIG. 2 is a block diagram of an illustrative gaze-assisted touchscreen input system 200, in accordance with various embodiments. The system 200 may include input/output (I/O) devices 228, processing logic 202, and a storage device 226. The system 200 may be implemented by the computing system 100 of FIG. 1, in accordance with various embodiments. In particular, the components of the system 200 may be distributed in any suitable manner among one or more of the components of the computing system 100. Components of the system 200 may be described as implemented by the computing system 100 for illustrative purposes, but the system 200 may be implemented by any suitably configured computing device or collection of computing devices. In some embodiments, the system 200 may be implemented by the personal computing device 102 of the computing system 100. In some such embodiments, the touchscreen 104 may be integral to the personal computing device 102.

The system 200 may be configured to perform any of a number of gaze-assisted touchscreen input operations. For example, the system 200 may be configured to receive a touch signal indicative of a touch of a user on a touchscreen of the system 200, receive a gaze location signal indicative of a region of a user's gaze on the touchscreen, and generate an input signal based at least in part on the gaze location signal and the touch signal. The input signal may, e.g., be provided to an operating system of the system 200, an application running on the system 200, another device in communication with the system 200, or any other component internal or external to the system 200.

Although a number of components of the system 200 are illustrated in FIG. 2, various embodiments may omit components as appropriate for the gaze-assisted touchscreen input operations to be performed. For example, in some embodiments, the system 200 may not include the gaze location logic 204, but may be coupled with the gaze location logic 204 (embodied in, e.g., a separate device) via a wired or wireless communication pathway so as to be able to receive signals from and/or send signals to the gaze location logic 204. In another example, in some embodiments, the system 200 may not include the touch detection logic 206, but may be coupled with the touch detection logic 206 (embodied in, e.g., a separate device) via a wired or wireless communication pathway so as to be able to receive signals from and/or send signals to the touch detection logic 206. In another example, some embodiments of the system 200 may not be configured for display adjustment (as discussed below), and thus may not include the viewing position logic 212 and/or the display adjustment logic 216.

As noted above, the system 200 may include the I/O devices 228. The I/O devices 228 may include a touchscreen 104, an image capture device 232 and other devices 234. The touchscreen 104 may take the form of any of the embodiments discussed above with reference to FIG. 1.

In some embodiments, the image capture device 232 may include one or more cameras. As used herein, the term "camera" may include still image cameras and video cameras. A camera may be analog or digital. In some embodiments, the image capture device 232 may capture high-definition video. In some embodiments, the image capture device 232 may be configured to stream image data (e.g., video data) to the personal computing device 102 and/or the remote computing device 106 via a wired or wireless communication pathway (e.g., the pathways 108 and 112, respectively). In some embodiments, the image capture device 232 may be connected locally to (or integrated with) the personal computing device 102, while in other embodiments, the image capture device 232 may be remote from the personal computing device 102.

The image capture device 232 may use any imaging wavelength (e.g., visible or infrared light). In some embodiments, the image capture device 232 may include a visible light camera and an infrared camera, and may combine the images captured by these devices or treat them separately. In some embodiments, the image capture device 232 may include two or more cameras having different orientations (e.g., one camera that is mounted on a wearable personal computing device 102 and faces away from the user in a "world-facing" orientation, and one camera that is mounted on the personal computing device 102 and faces toward the user when the personal computing device 102 is in use). In some embodiments, the image capture device 232 may include a single image capture device (e.g., a single camera).

The image capture device 232 may include an array camera, in which multiple lenses enable simultaneous capture of multiple images of the same subject. Each image captured by an array camera may vary by exposure time, focal distance, white balance, etc. The image capture device 232 may include a processing device which is configured to execute any known technique for combining the images or provide various image browsing experiences (e.g., in conjunction with other components of the computing system 100). In some embodiments, the image capture device 232 may include a depth camera, which may provide information about the depth of various objects in the imaged scene. Some depth cameras may use a time-of-flight technique to determine depth information.

In some embodiments, the image capture device 232 may be mounted on or proximate to the touchscreen 104, and may capture one or more images of a user of the touchscreen 104. These images may be used to determine a region of the user's gaze (e.g., as discussed below with reference to the gaze location logic 204) and/or to determine a position of the user's eyes relative to the touchscreen 104 (e.g., as discussed below with reference to the viewing position logic 212). In some embodiments, the image capture device 232 may be mounted in a wearable personal computing device 102 that attaches on or near a user's eyes, and may capture images of the touchscreen 104 while the touchscreen 104 is being used. These images may be used to determine a region of the user's gaze (e.g., as discussed below with reference to the gaze location logic 204) and/or to determine a position of the user's eyes relative to the touchscreen 104 (e.g., as discussed below with reference to the viewing position logic 212).

The other devices 234 included in the I/O devices 228 may include any suitable input, output or storage devices, for example. Devices that may be included in the other devices 234 may include proximity sensors (which may be mounted in a user's glasses and in the touchscreen 104, and may generate a signal indicative of the distance between the user's eyes and the touchscreen 104), one or more microphones (which may be mounted on or proximate to the touchscreen 104 and may triangulate the position of the user's head based on analysis of the user's voice), or any other suitable devices. In some embodiments, the other devices 234 may include one or more light sources that may operate in conjunction with the image capture device 232 to generate visible, infrared or other types of light during image capture to aid in the identification of various features in the image. For example, some known eye tracking techniques use one or more infrared LEDs to provide illumination of a user's face and generate reflections on the surface of the cornea. The reflections may be used to locate the eye and the center of the cornea in the image.

As noted above, the system 200 may include the processing logic 202. The processing logic 202 may include a number of logic components. In some embodiments, the processing logic 202 may include gaze location logic 204. The gaze location logic 204 may be configured to generate a gaze location signal indicative of a region of a user's gaze on the touchscreen 104. A region of a user's gaze may include the one or more locations on the touchscreen 104 which are viewed with the highest acuity region of the user's eyes. In some embodiments, the processing logic 202 may include image capture logic 210, which may be coupled to the gaze location logic 204 and may be configured to receive an image of the user's eyes from the image capture device 232. The gaze location logic 204 may be configured to generate the gaze location signal based at least in part on the image received from the image capture device 232.

Figure 3:
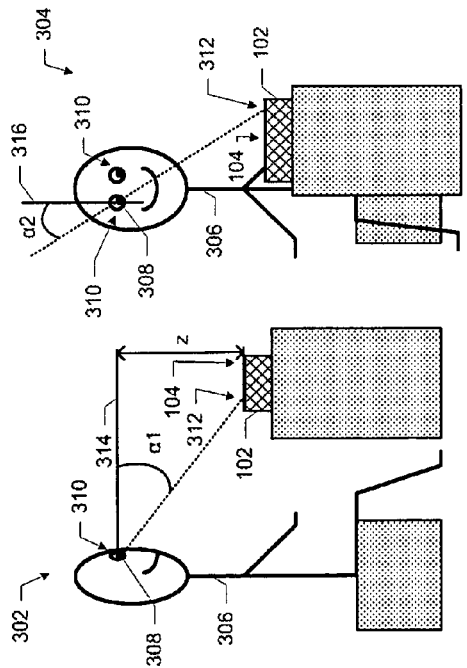
FIG. 3 illustrates a scenario for the generation of a gaze location signal when a user views a touchscreen of the computing system of FIG. 1, in accordance with various embodiments.

FIG. 3 depicts two views 302 and 304 of a scenario for the generation of a gaze location signal when a user 306 views the touchscreen 104 of the system 200, in accordance with various embodiments. In particular, the touchscreen 104 is shown as included in the personal computing device 102 (which may be, for example, a smartphone or tablet device). The gaze of the user 306 may be directed to the touchscreen 104, and in particular, to a region 312 on the touchscreen 104. The user's eyes 310 may be located at a distance z above the touchscreen 104 in a direction perpendicular to a surface of the touchscreen 104. The angle $\alpha 1$ may represent the angle at which the pupil 308 is directed, as measured from the horizontal plane 314 of the eyes 310. The angle $\alpha 2$ may represent the angle at which the pupil 308 is directed, as measured from the vertical plane 316 of the user's eyes 310. The user's gaze may be characterized by the distance z, and the angles $\alpha 1$ and $\alpha 2$, and the location signal (indicative of the gaze region 312) generated by the gaze location logic 204 accordingly.

The angles and distances represented in FIG. 3 are simply illustrative, and the gaze location logic 204 may use any suitable measurements from any suitable devices to determine the gaze region 312. Existing technologies for eye tracking include some which use multiple cameras arranged to capture images of, a user's eyes in a stereo configuration that enables the use of triangulation techniques to determine distance from the camera arrangement. Some technologies employ a physical model of the eye, which may include reflection and refraction properties of the cornea, the location of the center of the pupil and the center of curvature of the cornea, the offset of the fovea from the optical axis, the radius of curvature of the cornea, and other physical parameters. Any suitable gaze tracking technology may be implemented by the gaze location logic 204.

Figure 4:
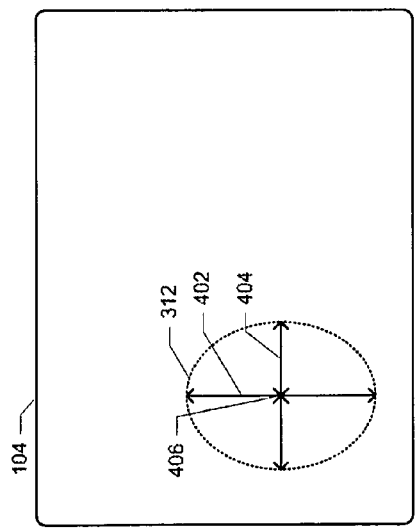
FIG. 4 illustrates a region of a user's gaze on the touchscreen of the computing system of FIG. 1, in accordance with various embodiments.

The gaze region 312 may be characterized in any of a number of ways. In some embodiments, the gaze region 312 may be characterized as a point on the touchscreen 104. In some such embodiments, the gaze location signal may represent the coordinates of the point in a coordinate system for the touchscreen 104 (e.g., (x,y) coordinates in a two-dimensional coordinate system in the plane of the touchscreen 104). In some embodiments, the gaze region 312 may be characterized as an area of the touchscreen 104. The area may have any suitable shape. For example, the gaze region 312 may be a circle, and the gaze location signal may represent coordinates of the center of the circle and may also represent the radius of the circle. In another example, the gaze region 312 may be an ellipse, and the gaze location signal may represent coordinates of the foci of the ellipse and the lengths of the major and minor axes of the ellipse. FIG. 4 illustrates an elliptical gaze region 312 on the touchscreen 104, having a major axis 402, a minor axis 404, and a center 406. In another example, the touchscreen 104 may be partitioned into a number of labeled rectangles or other polygons, and the gaze region may include one or more of these partitions. The boundaries and labels of the partitions may be stored in the storage device 226. In some such embodiments, the gaze location signal may represent the labels of each partition included in the gaze region. In another example, the gaze region 312 may have any shape (e.g., an irregular shape), and the gaze location signal may represent coordinates of the perimeter of the gaze region 312. The gaze location logic 204 may use any suitable characterization of the gaze region 312. The shape and/or size of the gaze region 312 may depend on the precision with which the gaze location logic 204 is able to determine where the gaze of the user 306 is directed. For example, the gaze location logic 204 may identify an elliptical gaze region with a minor axis corresponding to a direction in which the gaze of the user 306 may be determined with greater precision and a major axis corresponding to a direction in which the gaze of the user 306 may be determined with lesser precision.

In some embodiments, the processing logic 202 may include touch detection logic 206. The touch detection logic 206 may be configured to generate a touch signal indicative of a touch of a user on the touchscreen 104. A touch signal may include information regarding a location of the touch (e.g., one or more sets of (x,y) coordinates describing an area, shape or skeleton of the touch), a pressure of the touch (e.g., as measured by area of contact between a user's finger or a deformable stylus and the touchscreen 104, or by a pressure sensor), a duration of contact, any other suitable information, or any combination of such information.

In some embodiments, the processing logic 202 may include input registration logic 208. The input registration logic 208 may be coupled to the gaze location logic 204 and the touch detection logic 206. The input registration logic 208 may be configured to receive the gaze location signal from the gaze location logic 204 and to receive the touch signal from the touch detection logic 206. The input registration logic 208 may also be configured to generate an input signal based at least in part on the gaze location signal and the touch signal. As used herein, an "input signal" may be any signal provided as a user input. An input signal may be provided to a hardware or software component of the system 200 and/or to a hardware or software component of a device separate from the system 200. Examples of input signals may include a user's touch on a particular portion of the touchscreen 104 and the properties of that touch. Other examples of input signals may be a signal indicating a user selection of a particular option displayed on the touchscreen 104, the user invocation of a particular function through contact with the touchscreen 104, or any other signal indicative of a user input. In some embodiments, the input signal generated by the registration logic 208 may be generated at the operating system level of the system 200. For example, an operating system of the system 200 may be configured to generate touch signals that can be queried or otherwise monitored by applications running in the operating system (e.g., a map application may include a function that re-centers the map in response to a user tap at a particular location, and information about the tap and the location of the tap may be provided by an operating system-level function invoked by the map application). In such embodiments, the input registration logic 208 may evaluate touch signals at the operating system level before they are provided to applications, and thereby may serve to "filter" such touch signals. In some embodiments, the input registration logic 208 may operate at the application level, and may be used by a particular application to "filter" or otherwise process touch signals provided to the application by the operating system-level functions.

In some embodiments, the input registration logic 208 may be configured to generate the input signal through selection of one of a plurality of predetermined touch types based at least in part on the touch signal. Examples of predetermined touch types include a tap, a swipe, a pinch, and a spread. A tap may include a momentary single contact between the touchscreen 104 and a user (e.g., through a single finger or stylus). A swipe may include an extended single contact between the touchscreen 104 and the user over a line or curve (e.g., as may be useful when a user moves her finger from right to left to turn a page of a book rendered on the touchscreen 104). A pinch may include two simultaneous points of contact between the touchscreen 104 and the user, with those points of contact drawn together on the surface of the touchscreen 104 (e.g., as may be useful when a user brings her fingers closer together on the touchscreen 104 to zoom into a portion of a displayed webpage). A spread may include two simultaneous points of contact, between the touchscreen 104 and the user, with those points of contact drawn apart on the surface of the touchscreen 104. Other examples of touch types include press-and-hold, rotate, and slide-and-drag, for example. Different touch types may be associated with different regions of the touchscreen 104; for example, a "flick" touch type may be recognized by the system 200 when the user touches a point proximate to an edge of the touchscreen 104 and quickly and briefly slides her finger toward the interior of the touchscreen 104. Characteristics of various touch types may be stored in the storage device 226, and may be accessed by the input registration logic 208 (e.g., when the input registration logic 208 compares a received touch signal to the stored characteristics of various touch types in order to select a touch type that best corresponds to the received touch signal). In some embodiments, as discussed below, the input signal generated by the input registration logic 208 may indicate which touch type is associated with a detected touch.

In some embodiments, the input registration logic 208 may be configured to select one of the plurality of predetermined touch types based at least in part on the touch signal and the gaze location signal. As noted above, in some embodiments, the touch types stored in the storage device 226 may include one or more non-gaze-associated types and one or more gaze-associated types. A non-gaze-associated type may be a touch type whose location on the touchscreen does not typically correspond with the user's gaze region. In other words, a non-gaze-associated type represents a touch action that a user will perform without looking at the portion of the touchscreen on which the touch action is performed. In some embodiments, a swipe may be a non-gaze-associated type, in that users do not typically look at the same region of the touchscreen in which they're performing a swipe, A pinch may be another example of a non-gaze-associated type. A gaze-associated type may be a touch type whose location on the screen does typically correspond with the user's gaze region. In some embodiments, a tap may be a gaze-associated type, in that users typically look at the same region of the touchscreen in which they are tapping.

Whether a touch type is gaze-associated or non-gaze-associated may vary depending upon the context (e.g., depending upon which application is executing on the system 100 and displaying a user interface on the touchscreen 104). For example, some applications may use a swipe touch type in different regions of the touchscreen 104 to indicate user selection of various options. In such applications, a swipe touch type may be gaze-associated in that a user will typically look to the region of the touchscreen 104 corresponding to her selection. In other applications, a swipe touch type may be used to unlock a portion of a user interface (e.g., a control panel) or move to a previous document in a sequence of documents, for example. In such applications, a swipe touch type may not be gaze-associated, meaning that users will often look at regions of the screen other than the touched region when performing the swipe. The storage device 226 may store information about whether various touch types are gaze-associated or non-gaze-associated in various contexts (e.g., in various applications, operating systems, or other operating environments).

In some embodiments, the input registration logic 208 may be configured to select a touch type based on the gaze location signal by selecting a touch type that is gaze-associated or non-gaze-associated depending on the relative locations of the touch and the gaze region. In particular, the input registration logic 208 may determine, based at least in part on the touch signal, that the touch was located outside of the gaze region. In response to this determination, the input registration logic 208 may select a non-gaze-associated touch type for the touch. In some embodiments, in response to a determination by the input registration logic 208 that the touch was located within the gaze region, the input registration logic may select a gaze-associated or non-gaze-associated touch type for the touch.

Figure 5:
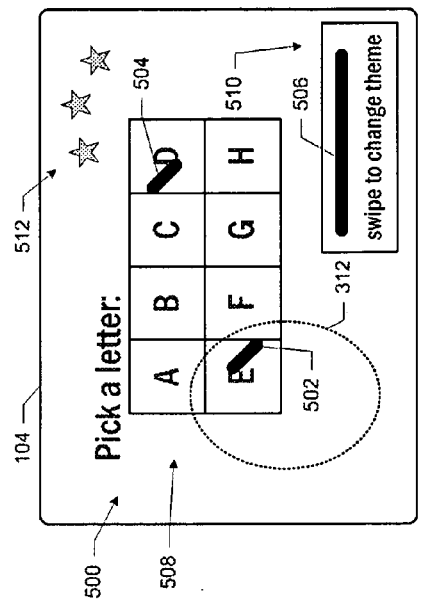
FIGS. 5 and 6 illustrate a region of a user's gaze, touches and displays rendered on the touchscreen of the computing system of FIG. 1 before and after processing of touch signals of a user, in accordance with various embodiments.

For example, FIG. 5 illustrates the gaze region 312 and several touches 502, 504 and 506 on the touchscreen 104. The touches 502 and 504 may represent touches that have a short duration and are highly localized relative to the extended contact area of the touch 506. In some embodiments, the touch detection logic 206 may analyze the characteristics of the touches 502, 504 (e.g., against a set of predetermined touch types stored in the storage device 226, as discussed above) and may select a preliminary touch type for each of the touches 502, 504 and 506 before any gaze location information is available, received and/or processed. In some embodiments, this preliminary determination may be made by the input registration logic 208; for ease of illustration, this preliminary determination will be discussed as performed by the touch detection logic 206. For example, the touch detection logic 206 may determine that the touches 502 and 504 are best classified as "taps" based on the duration of contact and the area of contact, while the touch 506 is best classified as a "slide." The touch detection logic 206 (or the input registration logic 208, as appropriate) may generate a preliminary touch type signal for each of these touches indicative of the corresponding touch type.

The input registration logic 208 may receive the preliminary touch type signals (or may receive the touch signals from the touch detection logic 206 without preliminary touch type Identification) and may determine whether a location of each touch is within the gaze region 312. If a touch location is not within the gaze region 312, the input registration logic 208 may select a non-gaze-associated touch type for that touch. If a touch location is within the gaze region 312, the input registration logic 208 may select a gaze-associated or a non-gaze associated-touch type for that touch. For example, as illustrated in FIG. 5, the touch 502 is located within the gaze region 312. If a tap is a gaze-associated touch type, and the characteristics of the touch 502 are compatible with the characteristics of a tap (e.g., as stored in the storage device 226), the input registration logic 208 may generate an input signal indicating that the touch 502 is a tap.

The touch 504, however, is not located within the gaze region 312. If a tap is a gaze-associated touch type, the input registration logic 208 may not generate an input signal indicating that the touch 504 is a tap even if the non-location characteristics of the touch 504 (e.g., the area and duration of contact) are compatible with the characteristics of a tap. Instead, the input registration logic 208 may seek another touch type compatible with the characteristics of the touch 504. If no suitable touch type can be found, the input registration logic 208 may select a "none" type. In some embodiments, the input registration logic 206 may select a "none" type by ignoring the touch 504 for the purposes of generating an input signal (e.g., the touch 504 may be treated as an incidental contact between the user and the touchscreen 104).

As further illustrated in FIG. 5, the touch 506 is located outside the gaze region 312. However, if the characteristics of the touch 506 are compatible with the characteristics of a slide (e.g., as stored in the storage device 226), and if a slide is a non-gaze-associated touch type, the input registration logic 208 may generate an input signal indicating that the touch 506 is a slide.

In some embodiments, the input registration logic 208 may not require a touch to be strictly within a gaze region for the touch to be designated as a gaze-associated touch type. For example, a touch may be partially within the gaze region and partially outside of the gaze region. In another example, a touch may commence within the gaze region and end outside of the gaze region. In another example, a touch need only be within a predetermined distance of the gaze region to be designated as a gaze-associated touch type (if appropriate). The predetermined distance may be an absolute distance (e.g., 1 centimeter), a relative distance (e.g., within a distance of a gaze region less than or equal to 10% of a radius of the gaze region), or any other suitable distance.

Returning to FIG. 2, in some embodiments, the processing logic 202 may include display logic 214. The display logic 214 may be coupled to the touchscreen 104, and may be configured to cause the display of various visual elements on the touchscreen 104. In some embodiments, the display logic 214 may be coupled to the input registration logic 208, and may be configured to cause the display, on the touchscreen 104, of one or more visual elements based on the input signal generated by the input registration logic 208.

Figure 6:
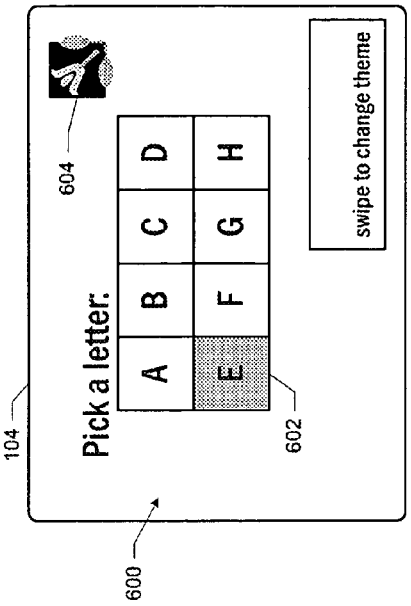

For example, FIG. 5 illustrates a display 500 on the touchscreen 104 that may be provided by the display logic 214. As shown in FIG. 5, the display 500 may include multiple visual elements, such as the letter blocks 508 and the theme change area 510. If the input registration logic 208 generates a "tap" input signal in response to the touch 502, as discussed above, the display logic 214 may cause the display, on the touchscreen 104, of a visual element based on this input signal. Such a visual element is shown in the display 600 of FIG. 6 as the shaded box 602. If the input registration logic 208 generates a "slide" input signal in response to the touch 506, as discussed above, the display logic 214 may cause the display, on the touchscreen 104, of a visual element based on this input signal. Such a visual element is shown in the display 600 as the theme graphic 604, which may replace the theme graphic 512 of the display 500.

In some embodiments, the gaze location logic 204 may be configured to generate multiple gaze location signals, each corresponding to a different user viewing the touchscreen 104. The touch detection logic 206 may be configured to generate multiple touch signals, each corresponding to different touches on the touchscreen 104. In some embodiments, the input registration logic 208 may be configured to receive the multiple location signals and the multiple touch signals, and determine which touch signals correspond to which users by comparing the locations of the touch signals to the gaze regions for each user. In particular, the input registration logic 208 may be configured to receive location signals corresponding to the gaze regions of each of two or more users, receive a touch signal, identify the gaze region closest to the location of the touch signal, and associate the touch signal with the user corresponding to the closest gaze region. In some embodiments, the input registration logic 208 may receive multiple touch signals, associate the touch signals with different users based on the proximity of the locations of the touch signals to different gaze regions (indicated by different gaze location signals), and generate multiple different input signals based at least in part on the received gaze location signals and the received touch signals. In some embodiments, the touch detection logic 206 may generate the multiple touch signals at least partially in parallel. In some embodiments, the input registration logic 208 may generate the multiple input signals at least partially in parallel.

FIG. 7 illustrates first and second users 702 and 704 viewing the touchscreen 104 (as shown, included in the personal computing device 102). The gaze of the first user 702 may be directed to a first region 706 on the touchscreen 104, and the gaze of the second user 704 may be directed to a second region 708 on the touchscreen 104. The first and second gaze regions 706 and 708 are illustrated as superimposed on the display 800 of the touchscreen 104 in FIG. 8. As illustrated in FIG. 8, the first and second gaze regions 706 and 708 may have different shapes, and may have different locations on the touchscreen 104. The gaze location logic 204 may generate first and second gaze location signals indicative of the first and second gaze regions 706 and 708, and may provide these gaze location signals to the input registration logic 208.

FIG. 8 also illustrates two touches 802 and 804. As shown, the touch 802 falls within the first gaze region 706. In some embodiments, the input registration logic 208 may be configured to receive the first gaze location signal (indicative of the first gaze region 706), receive the first touch signal (indicative of the touch 802) and determine that the touch 802 falls within the first gaze region 706. In response to that determination, the input registration logic 208 may determine that the touch 802 was performed by the first user 702, and may generate an input signal associated with the first user 702. The input registration logic 208 may also be configured to receive the second gaze location signal (indicative of the second gaze region 708), receive the second touch signal (indicative of the touch 804) and determine that the touch 804 falls at least partially within the second gaze region 708. In response to that determination, the input registration logic 208 may determine that the touch 804 was performed by the second user 704, and may generate an input signal associated with the second user 704.

In some embodiments, the input registration logic 208 may receive touch signals indicative of the touches 802 and 804 in parallel, in rapid succession, or in any suitable order relative to receipt of the gaze location signals indicative of the first and second gaze regions 706 and 708. Thus, the input registration logic 208 may evaluate all received touch signals (e.g., within a given window of time) against all received gaze location signals to determine which touch signals may correspond with the same user as a particular gaze location signal. In the example of FIG. 8, the input registration logic 208 may determine that the touch 802 is closer to the first gaze region 706 than to the second gaze region 708, and in response, determine that the touch 802 is not associated with the second user 704. Alternately, the input registration logic 208 may determine that the touch 802 is farther than a predetermined distance away from the second gaze region 708, and in response, determine that the touch 802 is not associated with the second user 704.

In embodiments in which the input registration logic 208 generates different input signals corresponding to different users, the display logic 214 may be configured to cause the display, on the touchscreen 104, of a first visual element based at least in part on the first input signal and a second visual element based at least in part on the second input signal. The first and second visual elements may be displayed simultaneously.

Returning to FIG. 8, the display 800 also includes first and second visual elements 806 and 808. The first and second visual elements 806 and 808 of FIG. 8 are avatars, and may represent player characters in a computer game or representatives in a virtual world environment, for example. The first visual element 806 may be associated with the first user 702 (e.g., the first visual element 806 may be a player character controlled by the first user 702) and the second visual element 808 may be associated with the second user 704. In some embodiments, in response to receiving the first and second gaze location signals and the touch signals indicative of the touches 802 and 804, the input registration logic 208 may generate an input signal indicating that the first user 702 wishes to move the first visual element 806 to the location of the touch 802 and an input signal indicating that the second user 704 wishes to move the second visual element 808 to the location of the touch 804. In response to these input signals, the display logic 214 may cause the display 900 of FIG. 9 on the touchscreen 104. As shown in FIG. 9, the first visual element 806 is relocated to the location 902 of the touch 802 and the second visual element 808 is relocated to the location 904 of the touch 804. In this manner, the input registration logic 208 may distinguish input signals from multiple users on a single touchscreen, and may enable multi-user computing applications such as game playing, editing of documents, simultaneous web browsing, or any other multi-user scenario.

Returning to FIG. 2, in some embodiments, the processing logic 202 may include viewing position logic 212. The viewing position logic 212 may be coupled to the input registration logic 208 and may generate a position signal indicative of a position of the user's eyes relative to the touchscreen 104. In some embodiments, the viewing position logic 212 may be coupled to the image capture logic 210, and may be configured to generate the position signal based at least in part on an image of the user's eyes received from the image capture device 232.

FIG. 10 depicts two views 1002 and 1004 of a scenario for the generation of a position signal when a user 1006 views the touchscreen 104 (shown as included in the personal computing device 102). The user's eyes 1010 may be located at a distance z above the touchscreen 104 in a direction perpendicular to a surface of the touchscreen 104. A reference point 1008 may be defined on the touchscreen 104 (or in any location whose position is defined with reference to the touchscreen 104). In some embodiments, the reference point 1008 may be a point at which the image capture device 232 is located on the personal computing device 102. The angle 131 may represent the angle at which the user's eyes 1010 are located, as measured from the horizontal plane 1014 of the surface of the touchscreen 104. The angle 132 may represent the angle at which the center point 1018 between the user's eyes 1010 is located, as measured from the vertical plane 1016 of the reference point 1008. The position of the user's eyes may be characterized by the distance z, and the angles 131 and 132, and the position signal generated accordingly by the viewing position logic 212.

The angles and distances represented in FIG. 10 are simply illustrative, and the viewing position logic 212 may use any suitable measurements to determine the position of the user's eyes for generating the position signal. For example, some existing technologies use images of the user's face, captured by an image capture device 232 mounted in a known position relative to the touchscreen 104, to create a three-dimensional model of landmarks on the user's face, and thereby determine the position of the user's eyes relative to the touchscreen 104. In some embodiments, one or more devices may be included in a head-mounted device (e.g., radio frequency identification tags included in a pair of glasses), and these devices may communicate with cooperating devices mounted on or proximate to the touchscreen 104 (e.g., radio frequency identification tag readers) to determine the relative position between the user's eyes and the touchscreen 104 (e.g., based on the strength of the radio frequency signals detected). Any known technique for head position modeling may be implemented by the viewing position logic 212.

In some embodiments, the processing logic 202 may include display adjustment logic 216. The display adjustment logic 216 may be coupled to the viewing position logic 212, and may be configured to generate an adjustment signal indicative of a desired visual distortion based at least in part on the position signal generated by the viewing position logic 212. In particular, the display adjustment logic 216 may be configured to determine an angle at which the user is viewing the touchscreen 104 (e.g., based on the position signal generated by the viewing position logic 212) and generate an adjustment signal to correct the display by visually distorting the displayed elements so that they appear to the user the same as they would appear if the user were viewing the touchscreen 104 in a direction perpendicular to a surface plane of the touchscreen 104. As used herein, "an angle at which the user is viewing the touchscreen" may include one or more angular measurements representing the position of the user's eyes relative to an axis that is perpendicular to the surface plane of the touchscreen. For example, an angle may include two angular measurements. In some embodiments, the display adjustment logic 216 may be configured to generate the adjustment signal in order to correct the apparent distortion of a display on the touchscreen 104 that occurs when a user views the touchscreen 104 from an angle other than an angle perpendicular to the surface plane of the touchscreen 104. Certain examples of this distortion may be referred to as the "keystone effect" or "tombstone effect." FIG. 11 illustrates an example of this distortion. In FIG. 11, a desired display 1100 is displayed (e.g., by the display logic 214) on the touchscreen 104. However, when the touchscreen 104 is viewed from an angle other than perpendicular to the surface plane of the touchscreen 104 (e.g., as illustrated by the perspective view 1102), the display 1100 will appear distorted. In particular, as illustrated in FIG. 11, the portion 1104 of the display 1100 closer to the user will be enlarged relative to the portion 1106 of the display 1100 farther from the user.

The display adjustment logic 216 may be configured to use the position signal generated by the viewing position logic 212 to generate an adjustment signal indicative of a distortion of the display 1100 so that a user viewing the touchscreen 104 from the position indicated by the position signal will see the display 1100 appropriately dimensioned. In particular, the display logic 214 may be coupled with the display adjustment logic 216, and may be configured to cause the display, on the touchscreen 104, of one or more visual elements distorted in accordance with the adjustment signal generated by the display adjustment logic 216. For example, FIG. 12 illustrates a display 1200 that may be generated by the display logic 214 based on the adjustment signal generated by the viewing position logic 212. The display 1200 may be distorted with respect to the desired display 1100. However, when the display 1200 is rendered on the touchscreen 104, a user viewing the touchscreen 104 from the position indicated by the position signal will see the perspective view 1202, correctly rendering the desired display 1100 to the user. In some embodiments, the display adjustment logic 216 may include a threshold of distortion such that, unless the user's position indicates that the distortion of the display should exceed the threshold, no adjustment should be made. Such a threshold may prevent the display adjustment logic 216 from making frequent and slight adjustments to the display on the touchscreen 104, which may be disconcerting for the user.

FIG. 13 is a flow diagram illustrating a process 1300 for generating gaze-assisted touchscreen inputs (e.g., inputs based on contact with the touchscreen 104), in accordance with some embodiments. The operations of the process 1300 (and the other processes described herein), although illustrated as performed in a particular sequence for the sake of illustration, may be performed in parallel as suitable or in any other order. For example, operations related to receiving a location signal may be performed in parallel, partially in parallel, or in any suitable order, relative to operations related to receiving a touch signal.

Operations of the process 1300 (and the other processes described herein) may be described as performed by components of the system 200, as embodied in the computing system 100, for illustrative purposes, but the operations of the process 1300 (and the other processes described herein) may be performed by any suitably configured computing device or collection of computing devices. Any of the operations of the process 1300 (and the other processes described herein) may be performed in accordance with any of the embodiments of the systems 100 and 200 described herein.

The process 1300 may begin at the operation 1302, in which a gaze location signal indicative of a region of a user's gaze on the touchscreen 104 may be received (e.g., by the input registration logic 208). The gaze location signal may be generated in accordance with any of the embodiments described herein. In some embodiments, the gaze location signal may be generated based on an image of the user's eyes from the image capture device 232.

At the operation 1304, a touch signal indicative of a touch of the user on the touchscreen 104 may be received (e.g., by the input registration logic 208). The touch signal may be generated in accordance with any of the embodiments described herein.

At the operation 1306, an input signal may be generated (e.g., by the input registration logic 208), based at least in part on the gaze location signal (received at the operation 1302) and the touch signal (received at the operation 1304). The input signal may be generated in accordance with any of the embodiments described herein. In some embodiments, the operation 1306 may include selecting one of a plurality of predetermined touch types based at least in part on the gaze location signal and the touch signal, and the input signal may indicate the selected touch type. In some such embodiments, the plurality of predetermined touch types may include one or more non-gaze-associated types and one or more gaze-associated types. Selecting one of a plurality of predetermined touch types based at least in part on the gaze location signal and the touch signal may include determining that the touch signal indicates that the touch was located outside of the region of the user's gaze, and, in response to determining that the touch signal indicates that the touch was located outside of the region of the user's gaze, selecting a non-gaze-associated type. The process 1300 may then end.

FIG. 14 is a flow diagram illustrating a process 1400 for generating gaze-assisted touchscreen inputs (e.g., inputs based on contact with the touchscreen 104), in accordance with some embodiments. The process 1400 may begin at the operation 1402, in which multiple gaze location signals indicative of multiple region of corresponding multiple users' gaze on the touchscreen 104 may be received (e.g., by the input registration logic 208). The gaze location signals may be generated in accordance with any of the embodiments described herein. For example, the gaze location signals may be generated based on one or more images of the users' eyes from the image capture device 232. For illustrative purposes, the remaining discussion of FIG. 14 may refer to two users (a first user and a second user), but the process 1400 may be applied to any number of users. In some embodiments, the multiple gaze location signals may be received at the operation 1402 at least partially in parallel.

At the operation 1404, a touch signal indicative of a touch of a user on the touchscreen 104 may be received (e.g., by the input registration logic 208). The touch signal may be generated in accordance with any of the embodiments described herein. In some embodiments, the touch signal may not identify which user performed the touch. In some embodiments, the operation 1404 may include receiving two touch signals indicative of the touch of one or more users on the touchscreen 104. In some embodiments, multiple touch signals may be received at the operation 1404 at least partially in parallel.

At the operation 1406, an input signal may be generated (e.g., by the input registration logic 208) based at least in part on the gaze location signals (received at the operation 1402) and the touch signal (received at the operation 1404). The input signal may be generated in accordance with any of the embodiments described herein. In some embodiments, the location of the touch (indicated by the touch signal received at the operation 1404) with the gaze regions of the first and second users (indicated by the gaze location signals received at the operation 1402) may be compared (e.g., by the input registration logic 208), and the touch may be assigned to one of the first and second users (e.g., by the input registration logic 208). This assignment may be based on proximity to the gaze regions, and may be executed in accordance with any of the embodiments discussed herein (e.g., those discussed above with reference to FIGS. 7-9). In embodiments of the process 1400 in which two touch signals are received at the operation 1404, each touch signal may be assigned to the first and second users as discussed above (e.g., by the system 200). In some embodiments, a first touch may be associated with a first user and a second touch may be associated with a second user. Thereafter, first and second input signals, corresponding to the first and second touches, may be generated (e.g., by the system 200).

At the operation 1408, the display of a visual element based at least in part on the input signal generated at the operation 1406 may be caused (e.g., by the display logic 214). For example, the movement of a visual element associated with the first user (e.g., a visual element representing the first user's avatar in a computer game) in response to the input signal may be caused. In embodiments in which first and second input signals are generated at the operation 1406, the simultaneous display, on the touchscreen 104, of a first visual element based at least in part on the first input signal and a second visual element based at least in part on the second input signal, may be caused (e.g., by the system 200). An example of such a display was discussed above with reference to FIGS. 8-9. The process 1400 may then end.

FIG. 15 is a flow diagram illustrating a process 1500 for generating gaze-assisted touchscreen inputs (e.g., inputs based on contact with the touchscreen 104), in accordance with some embodiments. The process 1500 may begin at the operation 1502, in which a position signal indicative of a position of the user's eyes relative to the touchscreen 104 may be received (e.g., by the viewing position logic 212). The position signal may be generated in accordance with any of the embodiments described herein (e.g., those discussed above with reference to FIGS. 10-12). For example, the position signal may be generated based on one or more images of the user's eyes from the image capture device 232.

At the operation 1504, an adjustment signal indicative of a desired visual distortion based at least in part on the position signal received at the operation 1502 may be generated (e.g., by the display adjustment logic 216). The adjustment signal may be generated in accordance with any of the embodiments described herein. In some embodiments, the adjustment signal may indicate adjustments to the display of a visual element on the touchscreen 104 to correct a keystone or related visual effect arising from the user's perspective on the touchscreen 104.

At the operation 1506, one or more visual elements distorted in accordance with the adjustment signal may be caused to be displayed on touchscreen 104 (e.g., by the display logic 214). An example of such a display was discussed above with reference to FIGS. 11-12. The process 1500 may then end.

In various embodiments, the processes 1300, 1400 and 1500 may be combined in any desired combination to perform touchscreen-related data processing operations. For example, in some embodiments, the process 1500 may be performed (e.g., by the system 200) to continually adjust the display on the touchscreen 104 in response to the position of the user's eyes. In addition, the adjusted display may include different visual elements associated with different users, the display of which may be adjusted in response to input signals from the different users generated in accordance with the process 1400. The combined process may also include the gaze-associated and non-gaze-associated touch type operations discussed above with reference to various embodiments of the process 1300. Accordingly, any desired combination of these processes may be performed to improve a user's touchscreen experience.

Various ones of the embodiments disclosed herein may improve the quality of experience of a user of a touchscreen device. In particular, some embodiments may improve the ability of computing systems to distinguish between two potential touch points that are close together on a touchscreen; by using gaze location information, the computing system may improve its ability to identify the desired touch point. Embodiments that distinguish between gaze-associated and non-gaze-associated touch types may improve the computing system's ability to distinguish between different touch types (e.g., reducing the likelihood that a pinch will be mistaken for a tap), enabling better interaction between the user and the computing system. Some embodiments that employ the display adjustment techniques disclosed herein may better align the points on the touchscreen that a user believes she has touched with the points she has actually touched, reducing user frustration.

The following paragraphs describe examples of embodiments of the present disclosure. Example 1 is a computing system with gaze-assisted touchscreen inputs, including input registration logic to: receive a touch signal indicative of a touch of a user on a touchscreen of the computing system, receive a gaze location signal indicative of a region of a user's gaze on the touchscreen, and generate an input signal to the computer system based at least in part on the gaze location signal and the touch signal.

Example 2 may include the subject matter of Example 1, and may further include gaze location logic, coupled to the input registration logic, to generate the gaze location signal.

Example 3 may include the subject matter of Example 2, and may further include image capture logic, coupled to the gaze location logic, to receive an image of the user's eyes from an image capture device, wherein the gaze location logic is to generate the gaze location signal based at least in part on the received image.

Example 4 may include the subject matter of any of Examples 1-3, and may further include touch detection logic, coupled to the input registration logic, to generate the touch signal.

Example 5 may include the subject matter of any of Examples 1-4, and may further specify that the input registration logic is to generate the input signal through selection of one of a plurality of predetermined touch types based at least in part on the gaze location signal and the touch signal, and that the input signal indicates the selected touch type.

Example 6 may include the subject matter of Example 5, and may further specify that the plurality of predetermined touch types includes one or more non-gaze-associated types and one or more gaze-associated types, and that selection of one of a plurality of predetermined touch types based at least in part on the gaze location signal and the touch signal includes: determination, based at least in part on the touch signal, that the touch was located outside of the region of the user's gaze; and, in response to the determination that the touch was located outside of the region of the user's gaze, selection of a non-gaze-associated type.

Example 7 may include the subject matter of any of Examples 1-6, and may further specify that the input registration logic is further to: receive a second touch signal indicative of a second touch of the user on the touchscreen; receive a second gaze location signal indicative of a second region of the user's gaze on the touchscreen; determine, based at least in part on the second touch signal, that the second touch was located outside of the second region of the user's gaze; determine, based at least in part on the second touch signal, that the second touch signal is not compatible with any non-gaze-associated touch types; and in response to a determination that the second touch was located outside of the second region of the user's gaze and a determination that the second touch signal is not compatible with any non-gaze-associated touch types, ignore the second touch signal for the purposes of generating of an input signal.

Example 8 may include the subject matter of any of Examples 1-7, and may further specify that the gaze location signal is a first gaze location signal, the user is a first user, the touch signal is a first touch signal, and the input signal is a first input signal, and that the input registration logic is to receive a second touch signal indicative of a touch of a second user on the touchscreen, receive a second gaze location signal indicative of a region of the second user's gaze on the touchscreen, and generate a second input signal based at least in part on the second gaze location signal and the second touch signal.

Example 9 may include the subject matter of Example 8, and may further include touch detection logic, coupled to the input registration logic, to generate the first and second touch signals at least partially in parallel.

Example 10 may include the subject matter of any of Examples 8-9, and may further include display logic to cause the display, on the touchscreen, of a first visual element based at least in part on the first input signal and a second visual element based at least in part on the second input signal, the first and second visual elements displayed simultaneously.

Example 11 may include the subject matter of any of Examples 1-10, and may further specify that the input registration logic is to receive a position signal indicative of a position of the user's eyes relative to the touchscreen, and that the input signal is based at least in part on the position signal.

Example 12 may include the subject matter of Example 11, and may further include viewing position logic, coupled to the input registration logic, to generate the position signal.

Example 13 may include the subject matter of any of Examples 11-12, and may further include: display adjustment logic, coupled to the viewing position logic, to receive the position signal and to generate an adjustment signal indicative of a desired visual distortion based at least in part on the position signal; and display logic, coupled with the display adjustment logic, to cause the display, on the touchscreen, of one or more visual elements distorted in accordance with the adjustment signal.

Example 14 is a method for generating gaze-assisted touchscreen inputs for a computing system, including: receiving, by the computing system, a gaze location signal indicative of a region of a user's gaze on a touchscreen of the computing system; receiving, by the computing system, a touch signal indicative of a touch of the user on the touchscreen; and generating, by the computing system, an input signal for the computing system based at least in part on the gaze location signal and the touch signal.

Example 15 may include the subject matter of Example 14, and may further include receiving, by the computing system, an image of the user's eyes from an image capture device, wherein the gaze location signal is based at least in part on the received image.

Example 16 may include the subject matter of any of Examples 14-15, and may further specify that generating an input signal based at least in part on the gaze location signal and the touch signal includes selecting one of a plurality of predetermined touch types based at least in part on the gaze location signal and the touch signal, and that the input signal indicates the selected touch type.

Example 17 may include the subject matter of Example 16, wherein the plurality of predetermined touch types includes one or more non-gaze-associated types and one or more gaze-associated types, and wherein selecting one of a plurality of predetermined touch types based at least in part on the gaze location signal and the touch signal includes: determining that the touch signal indicates that the touch was located outside of the region of the user's gaze; and, in response to determining that the touch signal indicates that the touch was located outside of the region of the user's gaze, selecting a non-gaze-associated type.

Example 18 may include the subject matter of any of Examples 14-17, and may further include: receiving a second touch signal indicative of a second touch of the user on the touchscreen; receiving a second gaze location signal indicative of a second region of the user's gaze on the touchscreen; determining, based at least in part on the second touch signal, that the second touch was located outside of the second region of the user's gaze; determining, based at least in part on the second touch signal, that the second touch signal is not compatible with any non-gaze-associated touch types; and in response to determining that the second touch was located outside of the second region of the user's gaze and that the second touch signal is not compatible with any non-gaze-associated touch types, ignore the second touch signal for the purposes of generating an input signal.

Example 19 may include the subject matter of any of Examples 14-18, wherein the gaze location signal is a first gaze location signal, the user is a first user, the touch signal is a first touch signal, and the input signal is a first input signal, and wherein the method may further include: receiving, by the computing system, a second gaze location signal indicative of a region of a second user's gaze on the touchscreen; receiving, by the computing system, a second touch signal indicative of a touch of the second user on the touchscreen; and generating, by the computing system, a second input signal based at least in part on the second gaze location signal and the second touch signal.

Example 20 may include the subject matter of Example 19, wherein receiving the first touch signal is performed by the computing system at least partially in parallel with receiving the second touch signal.

Example 21 may include the subject matter of any of Examples 19-20, and may further include causing simultaneous display, by the computing system on the touchscreen, of a first visual element based at least in part on the first input signal and a second visual element based at least in part on the second input signal.

Example 22 may include the subject matter of any of Examples 14-21, and may further include receiving, by the computing system, a position signal indicative of a position of the user's eyes relative to the touchscreen, wherein the touch signal indicative of a touch of the user on the touchscreen is based at least in part on the position signal.

Example 23 may include the subject matter of Example 22, and may further include: generating, by the computing system, an adjustment signal indicative of a desired visual distortion based at least in part on the position signal; and causing display, on the touchscreen, of one or more visual elements distorted in accordance with the adjustment signal.

Example 24 is one or more computer readable media having instructions thereon that, when executed by one or more processing devices of a computing device, cause the computing device to perform the method of any of Examples 14-23.

Example 25 is an apparatus including one or more processing devices and one or more computer readable media having instructions thereon that, when executed by the one or more processing devices, cause the apparatus to perform the method of any of Examples 14-23.

Example 26 is a system with gaze-assisted touchscreen inputs, including: means for receiving a gaze location signal indicative of a region of a user's gaze on a touchscreen of a computing system; means for receiving a touch signal indicative of a touch of the user on the touchscreen; and means for generating an input signal for the system based at least in part on the gaze location signal and the touch signal.

Example 27 may include the subject matter of Example 26, and may further include means for generating the gaze location signal.

Example 28 may include the subject matter of Example 27, wherein the means for generating the gaze location signal includes means for receiving an image of the user's eyes from an image capture device, wherein the gaze location signal is based at least in part on the received image.

Example 29 may include the subject matter of any of Examples 26-28, and may further include means for generating the touch signal.

Example 30 may include the subject matter of any of Examples 26-29, and may further specify that the means for generating an input signal based at least in part on the gaze location signal and the touch signal includes means for selecting one of a plurality of predetermined touch types based at least in part on the gaze location signal and the touch signal, and that the input signal indicates the selected touch type.

Example 31 may include the subject matter of Example 30, and may further specify that the plurality of predetermined touch types includes one or more non-gaze-associated types and one or more gaze-associated types, and that the means for selecting one of a plurality of predetermined touch types based at least in part on the gaze location signal and the touch signal includes: means for determining that the touch signal indicates that the touch was located outside of the region of the user's gaze; and means for, in response to determining that the touch signal indicates that the touch was located outside of the region of the user's gaze, selecting a non-gaze-associated type.

Example 32 may include the subject matter of any of Examples 26-31, and may further include: means for receiving a second touch signal indicative of a second touch of the user on the touchscreen; means for receiving a second gaze location signal indicative of a second region of the user's gaze on the touchscreen; means for determining, based at least in part on the second touch signal, that the second touch was located outside of the second region of the user's gaze; and means for determining, based at least in part on the second touch signal, that the second touch signal is not compatible with any non-gaze-associated touch types;

wherein the means for generating an input signal is configured to, in response to determining that the second touch was located outside of the second region of the user's gaze and that the second touch signal is not compatible with any non-gaze-associated touch types, ignore the second touch signal.

Example 33 may include the subject matter of any of Examples 26-32, and may further specify that the gaze location signal is a first gaze location signal, the user is a first user, the touch signal is a first touch signal, and the input signal is a first input signal, and that the system may further include: means for receiving a second gaze location signal indicative of a region of a second user's gaze on the touchscreen; means for receiving a second touch signal indicative of a touch of the second user on the touchscreen; and means for generating a second input signal based at least in part on the second gaze location signal and the second touch signal.

Example 34 may include the subject matter of Example 33, wherein the means for receiving the first touch signal is configured to receive the first touch signal at least partially in parallel with the reception of the second touch signal by the means for generating the second touch signal.

Example 35 may include the subject matter of any of Examples 33-34, and may further include means for causing simultaneous display, on the touchscreen, of a first visual element based at least in part on the first input signal and a second visual element based at least in part on the second input signal.

Example 36 may include the subject matter of any of Examples 26-35, and may further include means for receiving a position signal indicative of a position of the user's eyes relative to the touchscreen, wherein the touch signal indicative of a touch of the user on the touchscreen is based at least in part on the position signal.

Example 37 may include the subject matter of Example 36, and may further include means for generating the position signal.

Example 38 may include the subject matter of Example 37, and may further include: means for generating an adjustment signal indicative of a desired visual distortion based at least in part on the position signal, and means for causing display, on the touchscreen, of one or more visual elements distorted in accordance with the adjustment signal.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

What is claimed is:

1. A computer system with gaze-assisted touchscreen inputs, comprising:
   input registration logic to:
      receive a touch signal indicative of a touch of a user on a touchscreen of the computer system,
      receive a gaze location signal indicative of a region of a user's gaze on the touchscreen,
      determine whether a touch type of the touch signal is classified as a gaze-associated touch type or classified as a non-gaze-associated touch type,
      determine, based on the touch signal and the gaze location signal, whether the touch of the user is within the region of the user's gaze, and
      generate an input signal to the computer system based at least in part on the gaze location signal, the touch signal, the determined touch type, and the determination of whether the touch of the user is within the region of the user's gaze, wherein to generate the input signal, the input registration logic is to:
         generate an alpha input signal when the touch is located within the region of the user's gaze and has a gaze-associated touch type, wherein the alpha input signal is for performance of an alpha operation,
         generate a beta input signal when the touch is located outside the region of the user's gaze and has a gaze-associated touch type, wherein the beta input signal is for performance of a beta operation, and
         generate a gamma input signal when the touch has a non-gaze-associated touch type, wherein the gamma input signal is for performance of a gamma operation.

2. The computer system of claim 1, further comprising:
   gaze location logic, coupled to the input registration logic, to generate the gaze location signal.

3. The computer system of claim 2, further comprising:
   image capture logic, coupled to the gaze location logic, to receive an image of the user's eyes from an image capture device;
   wherein the gaze location logic is to generate the gaze location signal based at least in part on the received image.

4. The computer system of claim 1, further comprising:
   touch detection logic, coupled to the input registration logic, to generate the touch signal.

5. The computer system of claim 1, wherein:
   the touch type is one of a plurality of predetermined touch types, and the input registration logic is to generate the input signal through selection of one of the plurality of predetermined touch types based at least in part on the gaze location signal and the touch signal, and
   the input signal indicates the selected touch type.

6. The computer system of claim 5, wherein the plurality of predetermined touch types includes one or more non-gaze-associated types and one or more gaze-associated types, and wherein to select one of the plurality of predetermined touch types based at least in part on the gaze location signal and the touch signal, the input registration logic is to:
   determine, based at least in part on the touch signal, that the touch was located outside of the region of the user's gaze; and
   in response to the determination that the touch was located outside of the region of the user's gaze, select a non-gaze-associated type.

7. The computer system of claim 1, wherein the touch signal is a first touch signal, the touch is a first touch, the gaze location signal is a first gaze location signal, and the region of a user's gaze is a first region of a user's gaze, and wherein the input registration logic is further to:
   receive a second touch signal indicative of a second touch of the user on the touchscreen;
   receive a second gaze location signal indicative of a second region of the user's gaze on the touchscreen;
   determine, based at least in part on the second touch signal, that the second touch was located outside of the second region of the user's gaze;

determine, based at least in part on the second touch signal, that the second touch signal is not compatible with any non-gaze-associated touch types; and in response to a determination that the second touch was located outside of the second region of the user's gaze and a determination that the second touch signal is not compatible with any non-gaze-associated touch types, ignore the second touch signal for purposes of generating the input signal.

8. The computer system of claim 1, wherein the gaze location signal is a first gaze location signal, the user is a first user, the touch signal is a first touch signal, and the input signal is a first input signal, and wherein:

the input registration logic is to:
receive a second touch signal indicative of a touch of a second user on the touchscreen,
receive a second gaze location signal indicative of a region of the second user's gaze on the touchscreen, and
generate a second input signal based at least in part on the second gaze location signal and the second touch signal.

9. The computer system of claim 8, further comprising: touch detection logic, coupled to the input registration logic, to generate the first and second touch signals at least partially in parallel.

10. The computer system of claim 8, further comprising: display logic to cause display, on the touchscreen, of a first visual element based at least in part on the first input signal and a second visual element based at least in part on the second input signal, the first and second visual elements displayed simultaneously.

11. The computer system of claim 1, wherein the input registration logic is further to receive a position signal indicative of a position of the user's eyes relative to the touchscreen, and wherein the input signal is based at least in part on the position signal.

12. The computer system of claim 11, further comprising: viewing position logic, coupled to the input registration logic, to generate the position signal.

13. The computer system of claim 12, further comprising: display adjustment logic, coupled to the viewing position logic, to receive the position signal and to generate an adjustment signal indicative of a desired visual distortion based at least in part on the position signal; and
display logic, coupled with the display adjustment logic, to cause the display, on the touchscreen, of one or more visual elements distorted in accordance with the adjustment signal.

14. The computer system of claim 1, further comprising: a storage device to store touch information for each touch of a plurality of touches, wherein the touch information indicates a touch characteristic of each touch, a touch type classification of each touch, and a context for the touch type classification of each touch, and wherein the context is one of an application, an operating system, or an operating environment.

15. A method for generating gaze-assisted touchscreen inputs for a computer system, comprising:

receiving, by the computer system, a gaze location signal indicative of a region of a user's gaze on a touchscreen of the computer system;
receiving, by the computer system, a touch signal indicative of a touch of the user on the touchscreen;

determining, by the computer system, a touch type of the touch signal, wherein the touch type is classified as a gaze-associated touch type or classified as a non-gaze-associated touch type;

determining, by the computer system, whether the touch of the user is within the region of the user's gaze based on the touch signal and the gaze location signal; and generating, by the computer system, an input signal for the computer system based at least in part on the gaze location signal, the touch signal, the determined touch type, and the determination of whether the touch of the user is within the region of the user's gaze wherein generating the input signal comprises:

generating an alpha input signal when the touch is located within the region of the user's gaze and has a gaze-associated touch type, wherein the alpha input signal is to result in performance of an alpha operation, generating a beta input signal when the touch is located outside the region of the user's gaze and has a gaze-associated touch type, wherein the beta input signal is to result in performance of a beta operation, or generating a gamma input signal when the touch has a non-gaze-associated touch type, wherein the gamma input signal is to result in performance of a gamma operation.

16. The method of claim 15, wherein the touch signal is a first touch signal, the touch is a first touch, the gaze location signal is a first gaze location signal, and the region of a user's gaze is a first region of a user's gaze, and the method further comprises:

receiving a second touch signal indicative of a second touch of the user on the touchscreen;
receiving a second gaze location signal indicative of a second region of the user's gaze on the touchscreen;
determining, based at least in part on the second touch signal, that the second touch was located outside of the second region of the user's gaze;
determining, based at least in part on the second touch signal, that the second touch signal is not compatible with any non-gaze-associated touch types; and
in response to determining that the second touch was located outside of the second region of the user's gaze and that the second touch signal is not compatible with any non-gaze-associated touch types, ignoring the second touch signal for purposes of generating the input signal.

17. The method of claim 15, wherein the gaze location signal is a first gaze location signal, the user is a first user, the touch signal is a first touch signal, and the input signal is a first input signal, and wherein the method further comprises:

receiving, by the computer system, a second gaze location signal indicative of a region of a second user's gaze on the touchscreen;
receiving, by the computer system, a second touch signal indicative of a touch of the second user on the touchscreen; and
generating, by the computer system, a second input signal based at least in part on the second gaze location signal and the second touch signal.

18. One or more non-transitory computer readable media having instructions thereon that, when executed by one or more processing devices of a computer device, cause the computer device to:

receive a gaze location signal indicative of a region of a user's gaze on a touchscreen of the computer device;

receive a touch signal indicative of a touch of the user on the touchscreen;

determine a touch type of the touch signal, wherein the touch type is one of a gaze-associated touch type or a non-gaze-associated touch type;

determine, based on the touch signal and the gaze location signal, whether the touch of the user is within the region of the user's gaze; and generate an input signal for the computer system based at least in part on the gaze location signal, the touch signal, the determined touch type, and the determination of whether the touch of the user is within the region of the user's gaze wherein to generate the input signal, the instructions, when executed, cause the computer device to:

generate an alpha input signal when the touch is located within the region of the user's gaze and has a gaze-associated touch type, wherein the alpha input signal is for performance of an alpha operation, generate a beta input signal when the touch is located outside the region of the user's gaze and has a gaze-associated touch type, wherein the beta input signal is for performance of a beta operation, or generate a gamma input signal when the touch has a non-gaze-associated touch type, wherein the gamma input signal is for performance of a gamma operation.

19. The one or more non-transitory computer readable media of claim 18, further having instructions thereon that, when executed by one or more processing devices of the computer device, cause the computer device to:

receive an image of the user's eyes from an image capture device;

wherein the gaze location signal is based at least in part on the received image.

20. The one or more non-transitory computer readable media of claim 18, further having instructions thereon that, when executed by one or more processing devices of the computer device, cause the computer device to:

generate an input signal based at least in part on the gaze location signal and the touch signal comprises select one of a plurality of predetermined touch types based at least in part on the gaze location signal and the touch signal, and wherein the input signal indicates the selected touch type.

21. The one or more non-transitory computer readable media of claim 20, wherein the plurality of predetermined touch types includes one or more non-gaze-associated types and one or more gaze-associated types, and wherein to select one of a plurality of predetermined touch types based at least in part on the gaze location signal and the touch signal, the instructions, when executed, cause the computer device to:

determine that the touch signal indicates that the touch was located outside of the region of the user's gaze; and in response to a determination that the touch signal indicates that the touch was located outside of the region of the user's gaze, select a non-gaze-associated type.

22. The one or more non-transitory computer readable media of claim 18, wherein the touch signal is a first touch signal, the touch is a first touch, the gaze location signal is a first gaze location signal, and the region of a user's gaze is a first region of a user's gaze, and the one or more non-transitory computer readable media further having instructions thereon that, when executed by one or more processing devices of the computer device, cause the computer device to:

receive a second touch signal indicative of a second touch of the user on the touchscreen;

receive a second gaze location signal indicative of a second region of the user's gaze on the touchscreen;

determine, based at least in part on the second touch signal, that the second touch was located outside of the second region of the user's gaze;

determine, based at least in part on the second touch signal, that the second touch signal is not compatible with any non-gaze-associated touch types; and in response to a determination that the second touch was located outside of the second region of the user's gaze and a determination that the second touch signal is not compatible with any non-gaze-associated touch types, ignore the second touch signal for purposes of generating the input signal.

23. The one or more non-transitory computer readable media of claim 18, wherein the gaze location signal is a first gaze location signal, the user is a first user, the touch signal is a first touch signal, and the input signal is a first input signal, and wherein the one or more computer readable media further has instructions thereon that, when executed by one or more processing devices of the computer device, cause the computer device to:

receive a second gaze location signal indicative of a region of a second user's gaze on the touchscreen;

receive a second touch signal indicative of a touch of the second user on the touchscreen; and generate a second input signal based at least in part on the second gaze location signal and the second touch signal.

24. The one or more non-transitory computer readable media of claim 23, further having instructions thereon that, when executed by one or more processing devices of the computer device, cause the computer device to:

cause simultaneous display, on the touchscreen, of a first visual element based at least in part on the first input signal and a second visual element based at least in part on the second input signal.

25. The one or more non-transitory computer readable media of claim 18, further having instructions thereon that, when executed by one or more processing devices of the computer device, cause the computer device to:

receive a position signal indicative of a position of the user's eyes relative to the touchscreen;

wherein the touch signal indicative of a touch of the user on the touchscreen is based at least in part on the position signal.

26. The one or more non-transitory computer readable media of claim 25, further having instructions thereon that, when executed by one or more processing devices of the computer device, cause the computer device to:

generate an adjustment signal indicative of a desired visual distortion based at least in part on the position signal; and cause display, on the touchscreen, of one or more visual elements distorted in accordance with the adjustment signal.

* * * * *